United States Patent
Yang

(10) Patent No.: US 6,977,282 B1
(45) Date of Patent: Dec. 20, 2005

(54) PREPARATION OF DICYCLOPENTADIENE-CONTAINING UNSATURATED POLYESTERS

(75) Inventor: Lau S. Yang, Wilmington, DE (US)

(73) Assignee: Lyondell Chemical Technology, L.P., Greenville, DE (US)

( * ) Notice: Subject to any disclaimer, the term of this patent is extended or adjusted under 35 U.S.C. 154(b) by 32 days.

(21) Appl. No.: 10/916,134

(22) Filed: Aug. 11, 2004

(51) Int. Cl.$^7$ .............................................. C08F 20/00
(52) U.S. Cl. ...................... 525/445; 528/281; 528/306; 524/745; 525/437
(58) Field of Search ................................ 528/281, 306; 524/745; 525/437, 445

(56) References Cited

U.S. PATENT DOCUMENTS

| | | | |
|---|---|---|---|
| 3,347,806 A | 10/1967 | Zimmermann | 260/22 |
| 4,029,848 A | 6/1977 | Nelson | 428/430 |
| 4,140,724 A | 2/1979 | Nyi et al. | 568/665 |
| 4,148,765 A | 4/1979 | Nelson | 260/22 |
| 4,233,432 A | 11/1980 | Curtis, Jr. | 528/298 |
| 4,522,977 A | 6/1985 | Gardner | 525/48 |
| 4,753,982 A | 6/1988 | Hefner, Jr. | 525/31 |
| 5,319,006 A | 6/1994 | Yang et al. | 523/500 |
| 5,436,313 A | 7/1995 | Klang et al. | 528/274 |
| 5,436,314 A | 7/1995 | Yang et al. | 528/274 |
| 5,677,396 A | 10/1997 | Klang | 525/445 |
| 5,696,225 A | 12/1997 | Cai et al. | 528/297 |
| 5,780,558 A | 7/1998 | Klang et al. | 525/445 |
| 5,854,359 A | 12/1998 | Yang | 525/444 |
| 5,880,225 A | 3/1999 | Yang et al. | 525/440 |
| 6,492,487 B1 | 12/2002 | Yang et al. | 528/272 |
| 6,515,071 B1 | 2/2003 | Riley et al. | 525/44 |
| 6,555,623 B1 | 4/2003 | Yang et al. | 525/168 |
| 6,696,521 B2 | 2/2004 | Yang et al. | 525/168 |

OTHER PUBLICATIONS

W. Meyer, "DCPD: Abundant resin raw material," *Hydrocarbon Processing*, Sep. 1976, paragraph 2, p. 235.

B. C. Trivedi and B. M. Culbertson, "Maleic Anhydride," *Indus. Eng. Chem. Prod. Res.Dev.* 3 (*3*), 218 (1964).

Primary Examiner—Samuel A. Acquah
(74) Attorney, Agent, or Firm—Shao-Hua Guo

(57) ABSTRACT

A process for making dicyclopentadiene (DCPD)-containing polyesters is disclosed. The process comprises reacting 2-methyl-1,3-propanediol with maleic anhydride to form an acid terminated prepolymer and then reacting the prepolymer with a low grade DCPD to form DCPD-containing polyesters. The reaction of the prepolymer with DCPD is catalyzed by a transition metal triflate catalyst.

14 Claims, No Drawings

PREPARATION OF DICYCLOPENTADIENE-CONTAINING UNSATURATED POLYESTERS

FIELD OF THE INVENTION

The invention relates to the preparation of dicyclopentadiene (DCPD)-containing polyesters. In particular, the invention relates to preparing unsaturated polyesters from 2-methyl-1,3-propanediol, maleic anhydride, and low grade DCPD.

BACKGROUND OF THE INVENTION

Many glycols are used for making unsaturated polyesters. Examples are ethylene glycol, diethylene glycol, propylene glycol, dipropylene glycol, and neopentyl glycol. The degree of isomerization of maleate to fumarate largely depends on the glycol used. In general, the use of a primary glycol leads to a low degree of isomerization, while the use of a secondary glycol leads to a high degree of isomerization. For instance, the esterification of maleic anhydride with neopentyl glycol, ethylene glycol, and propylene glycol gives fumarate/maleate ratios of 50/50, 75/25, and 93/7, respectively. See Ind. Eng. Chem. Prod. Res. Dev. 3(3), 218 (1964). Although propylene glycol gives high fumarate content, it has lower reactivity toward condensation and the resultant unsaturated polyester often has a dark color and poor appearance.

2-Methyl-1,3-propanediol (MPD) is a relatively new glycol. It is an easily handled liquid, it has a high boiling point, and it has two primary hydroxyl groups for rapid condensation. However, like other primary glycols, MPD disadvantageously gives unsaturated polyesters having low fumarate/maleate ratios (60/40 to 70/30). Many efforts have been made to increase the fumarate content of unsaturated polyesters made from MPD. For instance, U.S. Pat. No. 6,492,487 teaches a process for making unsaturated polyesters from MPD that have fumarate/maleate ratios greater than 85/15. The process uses propylene glycol to boost the isomerization of maleate to fumarate in a late stage of the polymerization. Further, U.S. Pat. No. 6,555,623 teaches a process which comprises first reacting one equivalent of an aromatic diacid with about two equivalents of MPD to produce an ester diol and then reacting one equivalent of the ester diol with from about 1.1 to about 1.9 equivalents of maleic anhydride. The polyester produced has a fumarate/maleate ratio of 90/10 or greater.

Dicyclopentadiene (DCPD) modified polyester resins are also known. See for example U.S. Pat. Nos. 3,347,806, 4,029,848, 4,148,765, and 4,233,432. A general process of preparing DCPD modified polyester resins is first reacting a carboxylic acid or anhydride with DCPD in the presence of water to form a half ester and then reacting the half ester with glycols to produce the polyester.

DCPD is available in a number of grades. The low purity grades contain as much as 2 wt % of cyclopentadiene trimers. The "polyester grade" DCPD, which has less than 0.1 wt % of trimer, is commercially used to make unsaturated polyesters. Economically it would be desirable to use the less expensive low grade DCPD, but the use of the low grade DCPD yields polyester resins containing gel particles which plug spraying equipment and filters.

Efforts have been made to prepare gel particle free polyester resins using low grade DCPD. For instance, U.S. Pat. No. 6,515,071 teaches a process which involves forming a half ester of a low grade DCPD and a dicarboxylic acid in the presence of water by two stages: heating a mixture of DCPD, dicarboxylic acid and water at a relatively low temperature (<150° C.) and then raising the temperature up to about 220° C. The resulting half ester then reacts with glycols to form polyester. This process, however, is essentially the same as the above-discussed conventional process.

New processes for making DCPD modified polyesters are needed. Ideally, the unsaturated polyester is made from 2-methyl-1,3-propanediol, maleic anhydride, and a low grade DCPD and the unsaturated polyester has a high fumarate/maleate ratio.

SUMMARY OF THE INVENTION

The invention is a process for making a high performance unsaturated polyester from 2-methyl-1,3-propanediol, maleic anhydride, and a low grade dicyclopentadiene (DCPD). The process comprises reacting 1.0 equivalent of 2-methyl-1,3-propanediol with from about 1.1 to about 2.0 equivalents of maleic anhydride to form an acid terminated prepolymer and then reacting the prepolymer with a low grade DCPD. The low grade DCPD contains more than 0.1 wt % of cyclopentadiene trimers. The reaction of the prepolymer with DCPD is catalyzed by a transition metal triflate catalyst. Unlike the known processes in the art, the process of the invention produces an unsaturated polyester having a high fumarate/maleate ratio and essentially no gel particles in styrene solution.

DETAILED DESCRIPTION OF THE INVENTION

The process of the invention involves two steps. In the first step, 1.0 equivalent of 2-methyl-1,3-propanediol reacts with from about 1.1 to about 2.0 equivalents of maleic anhydride to produce an acid terminated prepolymer. Preferably, 1.0 equivalent of 2-methyl-1,3-propanediol reacts with from about 1.2 to about 2.0 equivalents of maleic anhydride. More preferably, 1.0 equivalent of 2-methyl-1,3-propanediol reacts with from about 1.2 to about 1.5 equivalents of maleic anhydride. When more equivalents of maleic anhydride than 2-methyl-1,3-propanediol are used, the prepolymer produced are predominantly terminated by acid groups. I found that when more equivalents of maleic anhydride than 2-methyl-1,3-propanediol are used, the acid terminated prepolymer has a high fumarate/maleate ratio (greater than 90/10). High fumarate/maleate ratio is advantageous because it leads to easy-curing unsaturated polyesters.

Preferably, the reaction of 2-methyl-1,3-propanediol and maleic anhydride is performed at a temperature within the range of about 175° C. to about 225° C., more preferably from about 185° C. to about 215° C., and most preferably from about 195° C. to about 210° C. Lower reaction temperature gives a product with lighter color and better appearance. An advantage of 2-methyl-1,3-propanediol is that it has two primary hydroxyl groups and thus its condensation with maleic anhydride does not require high reaction temperature.

Preferably, the reaction is performed under an inert atmosphere to minimize oxidative side-reactions. This is particularly important when the reaction temperature is relatively high. Preferably, a steam-jacketed reflux condenser is used. Such a condenser allows an efficient removal of water or other volatile products from the reaction mixture but keeps the reactants in the reactor. The use of a steam-jacketed reflux condenser also helps to avoid a high temperature, which otherwise is often needed to drive water out of the reaction mixture.

In the second step, the prepolymer reacts with a low grade dicyclopentadiene (DCPD) to form DCPD-containing unsaturated polyester. DCPD is commercially available in a number of grades. Impurities present in DCPD include adducts of cyclopentadiene with isoprene referred to as $C_{10}$ co-dimers and cyclopentadiene trimers referred to $C_{15}$ isomers. The so called "polyester grade" DCPD usually has less than 0.1 wt % of trimer content. By "low grade," I mean that the DCPD contains more than 0.1 wt % of trimers. An advantage of the process of the invention is that lower grades of DCPD can be used without significant gel particle formation.

The amount of DCPD used varies depending on the desired polyester products. Preferably, DCPD is used in an amount from about 10 wt % to about 50 wt % of the unsaturated polyester. More preferably, the amount is from about 15 wt % to about 45 wt % of the unsaturated polyester. Most preferably, the amount is from about 20 to about 40 wt % of the unsaturated polyester. An advantage of the invention is that a high concentration of DCPD can be incorporated into the unsaturated polyester without gel formation.

The second step is performed in the presence of a transition metal triflate catalyst. Preferably, the triflate catalyst is selected from zinc triflate or lanthanum triflate. Zinc triflate is particularly preferred. Preferably, the catalyst is used in an amount within the range of about 5 ppm to about 500 ppm of the unsaturated polyester. More preferably, the amount of the catalyst is within the range of about 25 ppm to about 250 ppm. Most preferably, the amount of the catalyst is within the range of about 50 ppm to about 200 ppm.

Preferably, a two-stage temperature is used in the second step: the reaction is performed first at a lower temperature (about 100° C. to about 140° C.), and finished at a higher temperature (about 150° C. to about 200° C.). An advantage of the invention is that the reaction of the acid terminated prepolymer and DCPD is performed in the essentially absence of water and therefore the process is less complicated than the conventional.

The invention includes the DCPD-containing unsaturated polyester made by the process of the invention. The unsaturated polyester comprises recurring units of 2-methyl-1,3-propanediol, maleate, fumarate, and DCPD, wherein the fumarate/maleate ratio is greater than 90/10. The unsaturated polyester contains essentially no gel particles.

The unsaturated polyester can be free-radically cured with a vinyl monomer. Examples of vinyl monomers include unsubstituted and substituted vinyl aromatics, vinyl esters of carboxylic acids, acrylates, methacrylates, hydroxyalkyl acrylates, hydroxyalkyl methacrylates, acrylamides, methacrylamides, acrylonitrile, methacrylonitrile, alkyl vinyl ethers, allyl esters of aromatic di- and polyacids, and the like, and mixtures thereof. Preferred vinyl monomers are vinyl aromatics, halogenated vinyl aromatics, methacrylic acid esters, and diallyl esters of aromatic di- and polyacids. Particularly preferred vinyl monomers are styrene, vinyl toluene, methyl methacrylate, and diallyl phthalate.

Generally, the amount of vinyl monomer used will be within the range of about 10 to about 70 wt % based on the amount of cured thermoset. A more preferred range is from about 20 to about 65 wt %. A most preferred range is from 25 wt % to 50 wt %. Typically, a mixture of unsaturated polyester and vinyl monomer is combined with a free-radical initiator at room or elevated temperature, and is cured to give a thermoset polymer. The thermosets are often used to form composite materials. A composite usually comprises a thermoset polymer and organic or inorganic fillers including particles, pigments, and fibers (glass, carbon, nylon, and cotton).

The following examples merely illustrate the invention. Those skilled in the art will recognize many variations that are within the spirit of the invention and scope of the claims.

EXAMPLE 1

Preparation of Unsaturated Polyester From 2-methyl-1,3-propanediol, Maleic Acid and DCPD A. Preparing Acid Terminated Prepolymer A two-liter reactor equipped with a mechanical stirrer, nitrogen inlet, and steam-jacketed condenser is charged with 2-methyl-1,3-propanediol (675 grams) and maleic anhydride (980 grams). The mixture is heated to 200° C. for about 4 hours to give an acid terminated prepolymer.

B. Reacting Ester Oligomer with DCPD

A half-liter reactor equipped with a mechanical stirrer, nitrogen inlet, and steam-jacketed condenser is charged with the ester oligomer from Step A (200 grams) and zinc trifloromethanesulfonate (43 mg, product of Aldrich). The mixture is heated to 125° C. DCPD 101 (80 grams, product of Equistar Chemicals, LP, containing about 1 wt % of trimer) is added dropwise to the mixture maintaining the temperature below 135° C. After the addition, the reaction continues at the same temperature reading for four hours. KOH (40 mg, dissolved in a small amount of 2-methyl-1, 3-propanediol and water) and hydroquinone (60 mg) are added to the mixture. The mixture is heated at 180° C. for about two hours. The product is cooled to 150° C. and blended with styrene to form a solution containing 70% polyester solids and 30% styrene. The solution is stabilized with 100 ppm of hydroquinone and 100 ppm of t-butyl hydroquinone. The product solution is clear and free from gel particles. The polyester contains about 29 wt % of DCPD recurring units.

EXAMPLE 2

Preparation of Unsaturated Polyester From 2-methyl-1,3-propanediol, Maleic Acid and DCPD A two-liter reactor equipped with a mechanical stirrer, nitrogen inlet, and steam-jacketed condenser is charged with the prepolymer from Step A, Example 1 (885 grams) and zinc trifloromethanesulfonate (280 mg). The mixture is heated to 125° C. DCPD 101 (550 grams) is added dropwise to the mixture maintaining the temperature below 135° C. After the addition, the reaction continues at the same temperature reading for three hours. KOH (100 mg, dissolved in a small amount of 2-methyl-1,3-propanediol and water) and hydroquinone (240 mg) are added to the mixture. The mixture is heated at 180° C. for about two hours. The product is cooled to 150° C. and blended with styrene to form a solution containing 70% polyester solids and 30% styrene. The solution is stabilized with 100 ppm of hydroquinone and 100 ppm of t-butyl hydroquinone. The product solution is clear and free from gel particles. The polyester contains about 38 wt % of DCPD recurring units.

COMPARATIVE EXAMPLE 3

Conventional Synthesis Using Polyester Grade DCPD

A one-liter reactor is charged with maleic anhydride (294 grams) and water (38 grams). The reactor is slowly heated to melt the maleic anhydride. The mixture is then heated to about 100° C. Polyester grade DCPD (237 grams, DCPD 103, product of Equistar Chemicals, LP, containing less than 0.1 wt % of trimers) is added dropwise to the mixture maintaining the temperature below 130° C. After the addition, the reaction mixture is heated at 130° C. to 135° C. for two hours. 2-Methyl-1,3-propanediol (210 grams) is added and the mixture is heated to 210° C. and kept at that temperature for six hours. The product is cooled to 150° C. and blended with styrene to form a solution containing 70% polyester solids and 30% styrene. The solution is stabilized with 100 ppm of hydroquinone and 100 ppm of t-butyl hydroquinone. The product solution is yellowish but is free from gel particles.

COMPARATIVE EXAMPLE 4

Conventional Synthesis Using Low Grade DCPD

Comparative Example 3 is repeated, but DCPD 101 is used. The product solution contains a large number of gel particles when mixed with styrene.

EXAMPLE 5

Curing Unsaturated Polyesters

The products from example 1–3 are adjusted to contain 35% styrene and cased in glass mold with 1.5% MEK peroxide and 0.2% cobalt naphthalenate. The cured plates are tested for tensile and flexural properties and the results are listed in Table 1. Table 1 shows that the products made from DCPD 101 according to the invention are better than the conventional polyester made from DCPD 103.

TABLE 1

Physical Properties of Cured Unsaturated Polyesters

|  | Example 1 | Example 2 | Comparative Example 3 |
|---|---|---|---|
| DCPD, % of polyester resin | 29 | 38 | 32 |
| DCPD Type | 101 | 101 | 103 |
| Tensile strength, psi | 7140 | 8390 | 7300 |
| Tensile modulus, kpsi | 500 | 530 | 480 |
| Elongation, % | 1.82 | 2.28 | 1.8 |
| Flex strength, psi | 15600 | 17000 | 16000 |
| Flex modulus, kpsi | 520 | 530 | 530 |
| HDT, ° C. | 115 | 99 | 84 |
| Fumarate content, % | 92 | 92 | 75 |
| Viscosity @ 35% styrene, cps | 300 | 300 | 300 |

I claim:

1. A process comprising
   (a) reacting 1.0 equivalent of 2-methyl-1,3-propanediol with from about 1.1 to about 2.0 equivalents of maleic anhydride to form an acid terminated prepolymer; and
   (b) reacting the prepolymer with a low grade dicyclopentadiene (DCPD) containing more than 0.1 wt % of cyclopentadiene trimers in the presence of a transition metal triflate catalyst to form a DCPD-containing unsaturated polyester.

2. The process of claim 1 wherein the triflate is zinc triflate.

3. The process of claim 1 wherein the triflate is present in an amount within the range of about 25 ppm to about 250 ppm of the prepolymer.

4. The process of claim 3 wherein the amount of triflate is within the range of about 50 ppm to about 200 ppm.

5. The process of claim 1 wherein the low grade DCPD contains more than 0.1 wt % up to about 2 wt % of trimers.

6. The process of claim 1 wherein the unsaturated polyester contains from about 10 wt % to about 50 wt % of the DCPD.

7. The process of claim 1 wherein the unsaturated polyester contains from about 15 wt % to about 45 wt % of the DCPD.

8. The process of claim 1 wherein the unsaturated polyester contains from about 20 wt % to about 40 wt % of the DCPD.

9. The process of claim 1 wherein the unsaturated polyester has a fumarate/maleate ratio greater than 90/10 and is essentially gel free in styrene solution.

10. The process of claim 1 wherein step (b) is performed in two stages: the first stage is performed at a temperature within the range of about 100° C. to about 140° C. and the second stage is performed at a temperature within the range of about 150° C. to about 200° C.

11. An unsaturated polyester comprising recurring units of 2-methyl-1,3-propanediol, maleate, fumarate, and a low grade DCPD containing more than 0.1 wt % of cyclopentadiene trimers, wherein the fumarate/maleate ratio is greater than 90/10.

12. The unsaturated polyester of claim 11 wherein the DCPD contains more than 0.1 wt up to 2 wt % of cyclopentadiene trimers.

13. The unsaturated polyester of claim 12 which contains from about 20 wt % to about 40 wt % of DCPD.

14. A thermosetting composition comprising the unsaturated polyester of claim 11 and a monomer selected from the group consisting of vinyl aromatics, acrylates, methacrylates, vinyl ethers, vinyl esters, and mixtures thereof.

* * * * *